INVENTOR.
RICHARD R. BOOTH
BY Darby & Darby
ATTORNEYS

INVENTOR.
RICHARD R. BOOTH
BY
Darby & Darby
ATTORNEYS

Sept. 25, 1962 R. R. BOOTH 3,056,117

MAGNETIC CORE DEVICE

Filed Sept. 22, 1959 3 Sheets-Sheet 3

INVENTOR.
RICHARD R. BOOTH
BY
Darby & Darby
ATTORNEYS

United States Patent Office 3,056,117
Patented Sept. 25, 1962

3,056,117
MAGNETIC CORE DEVICE

Richard R. Booth, Poughkeepsie, N.Y., assignor to International Business Machines Corporation, New York, N.Y., a corporation of New York Filed Sept. 22, 1959, Ser. No. 841,506
14 Claims. (Cl. 340—174)

This invention relates to magnetic devices and more particularly to improvements in magnetic core devices for use in data storage systems and the like.

Magnetic core devices are often employed in data processing systems of the binary type as magnetic storage or "memory" elements. When the core portions of the devices are formed of a material having two stable magnetic states, the devices may be made to exhibit data storage characteristics by arbitrarily assigning a different value or meaning to each of the two magnetic states. For example, in a binary system, one magnetic state may be said to represent a binary "0" and the other magnetic state a binary "1." By suitably driving the magnetic core device to switch it from one magnetic state to the other, it is possible to perform functions such as "writing in" or "reading out" bits of information.

The copending patent application of Samuel K. Raker, Serial No. 619,484, now Patent No. 2,923,923, filed October 31, 1956, discloses and claims a magnetic core device which exhibits high switching speeds. The core device of the Raker application operates on a biased coincidence flux selection principle and may be switched from one stable magnetic state to the other by the simultaneous application of two or more driving pulses. This feature permits the core device to be used in two-dimensional magnetic storage matrices which consist basically of a "plane" of cores. Each core in a plane serves to store one binary bit of information. By arranging the cores of a plane in rows and columns and utilizing a common drive wire for the cores of each row and column, it is possible to select a particular core device in the plane for either a reading or writing operation. This is often referred to as "two-dimensional" reading or writing. When the drive wire linking the cores in a particular row or column in the plane is energized, the cores will not switch since they are only "half-selected." However, when the second drive wire linking a particular core in that row or column is simultaneously energized, that core is "fully selected" and will switch.

For certain applications, however, it is desirable that a magnetic core device be capable of being switched to one of its stable magnetic states by the application of two or more simultaneously applied drive pulses and to be switched to the other of its magnetic states by the application of only a single drive pulse. Therefore, the core device should be capable of two-dimensional operation for either of the reading or writing functions and of single-dimensional operation for the remaining function. This type of operation is preferred for the magnetic core devices utilized in so-called "tape skew converter systems," an example of which will be described hereinafter.

Accordingly, it is an object of this invention to provide a magnetic core device which is capable of being switched to one of its stable magnetic states by two-dimensional drive operation and of being switched to the other of its magnetic states by single-dimensional drive operation.

It is a further object of this invention to provide a magnetic memory device which is especially suited for use in "buffering" type applications, such as tape skew converter systems, for example.

Briefly, the magnetic core device of the invention comprises means defining a closed magnetic circuit having first and second pairs of flux paths and a main flux path coupling the two pairs of flux paths together. Means are provided for magnetically biasing one path of the first pair of flux paths to saturation in a first direction. Additionally, means are provided for selectively driving the other path of the first pair of flux paths to saturation in the first direction, so that a flux pattern is established in the main flux path in the first direction, and for driving both paths of the first pair of flux paths to saturation in a second direction, to thereby establish a flux pattern in the main flux path in the second direction. Therefore, by selectively operating the drive means, it is possible to switch the core device to one or the other of its stable magnetic states, to thereby perform reading and writing operations. By sensing the change in the flux pattern of at least one path of the second pair of flux paths, as by an output winding, for example, the core device may be read out to indicate the bit of information stored therein. Inasmuch as only one flux path of the first pair of flux paths is biased, the bias need only be overcome for switching in one direction, so that single-dimensional reading is possible while still maintaining the feature of two-dimensional writing.

Other objects of the invention will be pointed out in the following description and claims and illustrated in the accompanying drawings which disclose, by way of examples, the principle of the invention and the best mode, which has been contemplated, of applying that principle.

Figure 1A:
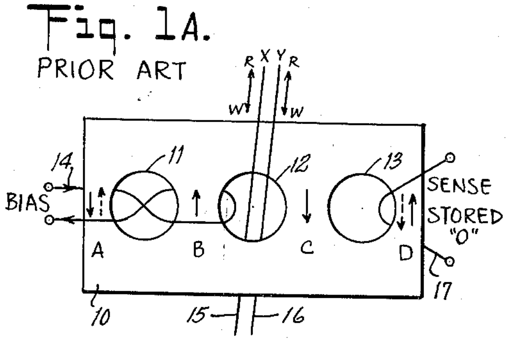
Fig. 1A. PRIOR ART
FIGS. 1A and 1B are schematic diagrams illustrating the basic operation of a magnetic core device, such as disclosed and claimed in the aforementioned Raker application, which utilizes two-dimensional writing and two-dimensional reading.
Figure 4:
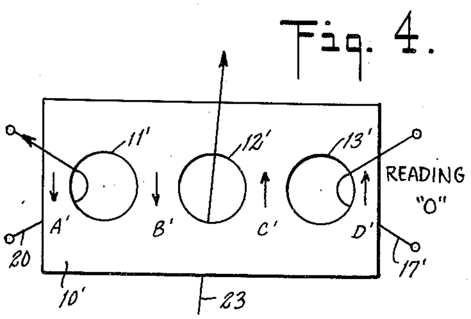
FIGS. 3–11 are schematic diagrams of the magnetic core device of the invention depicting the flux patterns therein for various reading and writing operations.

Referring now to FIG. 1A of the drawings, there is shown a magnetic core device of the type disclosed and claimed in the aforementioned Raker application. The device comprises a core 10 of magnetic material having two stable magnetic states. Apertures 11, 12 and 13 are formed in the core and serve to define legs A, B, C and D. A bias winding 14 is arranged to link both legs A and B of the core, so that the legs A and B are biased to saturation in the directions shown by the solid arrows. Drive windings 15 and 16 are arranged to link the main flux path of the core and to intersect aperture 12. Drive winding 15 is designated "X," while drive winding 16 is designated "Y," to indicate that they may be utilized for two-dimensional reading and writing when the core itself is employed in a magnetic storage matrix. A sense or output winding 17 is arranged to intersect aperture 13 and to link leg D of the core.

Figure 1B:
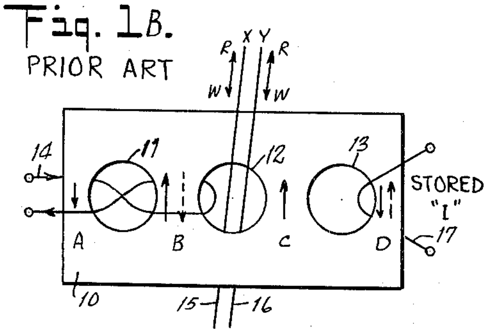
Fig. 1B. PRIOR ART
Figure 5:
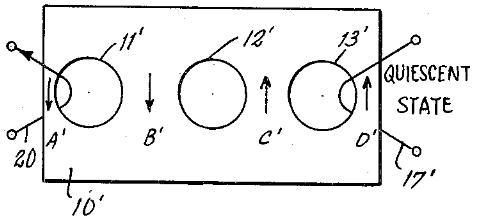

As indicated in the aforementioned Raker application, it is possible by suitably pulsing the drive windings 15 and 16 to change the direction of the flux in leg D of the core, so that the core may be made to store a binary "0" or a binary "1." By arbitrarily assigning a binary "0" designation to the upward direction of flux in leg D, as illustrated by the solid arrow in leg D, the core may be said to be in a quiescent state storing a binary "0." If both drive windings 15 and 16 are simultaneously pulsed in the write direction, as shown by the arrows adjacent the drive windings, the bias in leg A is overcome and the flux reverses direction as indicated by the dotted arrow in that leg. Since leg C is already saturated in a downward direction, the flux in leg D switches to a downward direction as shown by the dotted arrow, so that a binary "1" is written into the core. When the drive pulses are removed from windings 15 and 16, the bias in leg A once more becomes effective and the flux returns to a downward direction. Since the closed magnetic path through leg C is shorter, and hence of lower reluctance, than the path through leg D, the flux in leg C will switch to an upward direction to place the core in its quiescent state, thereby leaving the flux in leg D in its downward direction. Accordingly, FIG. 1B shows the core in a quiescent state having a binary "1" stored therein. If it is desired to read out the bit stored in the core after the previous writing operation, the drive windings 15 and 16 are pulsed in the opposite or read direction, so that as shown in FIG. 1B by the dotted arrows, the flux in legs B and D reverses in direction. Since the flux in leg D changes in direction, a voltage is induced in sense winding 17 which indicates that a binary "1" has been read out. At the conclusion of the reading operation, the bias in leg B once more returns the flux in that leg to an upward direction, so that the flux in leg C reverses to return the core to the quiescent state illustrated in FIG. 1A.

From the foregoing analysis of the core device of FIGS. 1A and 1B, it is believed apparent that before the core can be switched to either of its stable magnetic states, the bias in either leg A or leg B must be overcome by the joint operation of drive windings 15 and 16. Therefore, if only one of the drive windings is pulsed, as for example in a half-select operation, the effect of the bias in either leg A or leg B cannot be overcome, so that the flux pattern in legs C and D will remain unchanged. This feature permits both two-dimensional reading and two-dimensional writing functions to be obtained.

Figure 2:
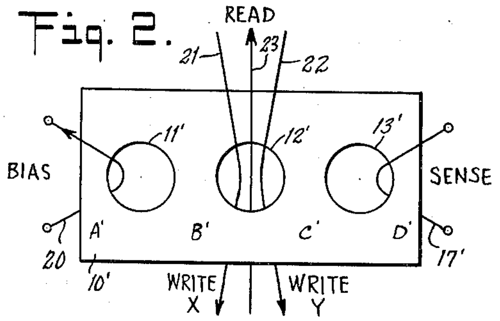
FIG. 2 is a schematic diagram of a magnetic core device constructed in accordance with the teachings of the present invention.
Figure 6:
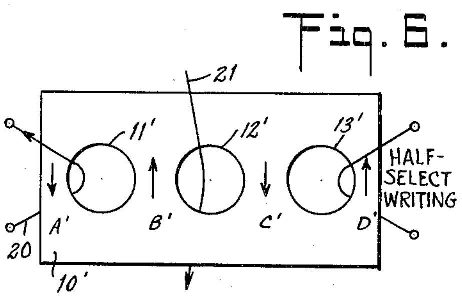

The structural differences between the magnetic core device of the present invention and the core device of the Raker application will become evident from an inspection of FIG. 2 of the drawings. As seen in FIG. 2, the magnetic core device of the invention comprises a core 10′ of magnetic material having two stable magnetic states. Apertures 11′, 12′ and 13′ respectively define legs A′, B′, C′ and D′. It may be noted, that like the core device of FIGS. 1A and 1B, legs B′ and C′ are arranged to respectively magnetically shunt legs A′ and D′. A bias winding 20 is arranged to intersect aperture 11′ and to link only leg A′ of the core. Therefore, leg A′ is biased while leg B′ is not. Drive windings 21 and 22 are arranged to intersect aperture 12′ and to link the closed magnetic circuit defined by the core 10′. Drive winding 21 is indicated as the write winding for the X direction while drive winding 22 is indicated as the write winding for the Y direction. A single read winding 23 is arranged to intersect aperture 12′ and to link the closed magnetic circuit. Finally, a sense winding 17′ is arranged to intersect aperture 13′ and to link output leg D′ of the core.

By virtue of this arrangement, two-dimensional writing of the core is achieved through the use of drive windings 21 and 22, while single-dimensional reading of the core is obtained by the use of read winding 23. Inasmuch as only leg A′ of the core is biased by the bias winding 20, it is apparent that the bias control is only effective for one direction of switching. For the bias current polarity illustrated, this would be the clockwise direction of switching. It is believed that the basic operation of the magnetic core device of the invention and the novel features of the invention will become more readily apparent from the following discussion of a complete operating sequence as illustrated in FIGS. 3–11 of the drawings.

Figure 3:
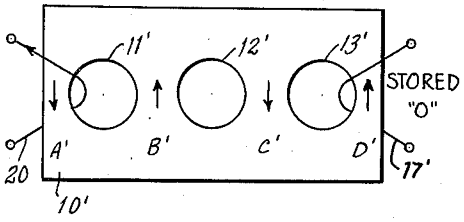
Figure 7:
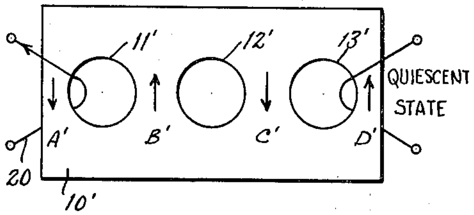

In FIG. 3 of the drawings, the magnetic core device of FIG. 2 is shown in a quiescent state with a binary "0" stored therein. Again, an upward direction of flux in leg D′ is arbitrarily designated as a stored binary "0," while a downward direction of flux in that leg is designated as a stored binary "1." It should be noted that with the core in a quiescent state, the bias winding 20 maintains the flux in leg A′ in a downward direction, while the flux in legs B′, C′ and D′ assume directions dependent upon the previous magnetic history of the core. Since the core defines a closed magnetic circuit with legs A′ and B′ connected in parallel and legs C′ and D′ connected in parallel, at any given instant the flux in two of the legs must be in an upward direction and the flux in the remaining two legs in a downward direction. Assuming now that it is desired to read out the binary "0" stored in the core, a drive pulse of the polarity indicated in FIG. 4 of the drawings is applied to read winding 23. This switches the flux in the main flux path of the core to a counterclockwise direction and places the core in the dynamic state shown in FIG. 4. Since leg A′ of the core is already saturated in a downward direction by bias winding 20, leg B′ of the core switches. Similarly, since leg D′ is already saturated in an upward direction, leg C′ switches. Because of the fact that the flux in leg D′ has not reversed its direction, no output pulse is produced in the sense winding 17′. Accordingly, the absence of an output pulse from the sense winding during a read operation indicates that a binary "0" was stored in the core. When the drive pulse applied to read winding 23 ends, the core assumes the quiescent state shown in FIG. 5 of the drawings. It may be noted that the flux directions of the legs remain the same as they were in the dynamic state of the core, since the direction of flux in biased leg A′ was not disturbed by the read operation.

Assuming next that the core is "half-selected" for writing, a pulse is applied to only one of the write windings, for example, winding 21 which controls writing in the X direction. The application of a write pulse to winding 21 having the polarity shown in FIG. 6 tends to produce a clockwise flux pattern around aperture 12′. Since the drive pulse in winding 21 is ineffective to overcome the bias in leg A′, the flux in leg B′ switches to an upward direction. This, of course, requires that the flux in either leg C′ or leg D′ be reversed to balance the core. However, the flux path through leg C′ is much shorter than the flux path through leg D′, with the result that leg C′ is switched to its opposite magnetic state and the flux therein assumes a downward direction. Accordingly, the pulsing of either of the write windings 21 and 22 alone does not switch leg D′ of the core, but merely switches the inner legs B′ and C′. When the half-select pulse is ended on the write winding 21, the core assumes the quiescent state shown in FIG. 7 of the drawings. Again, it may be noted that the flux pattern existing in legs A′, B′, C′ and D′ remains unchanged, since the application of the half-select pulse did not alter the direction of flux in biased leg A′.

Figure 8:
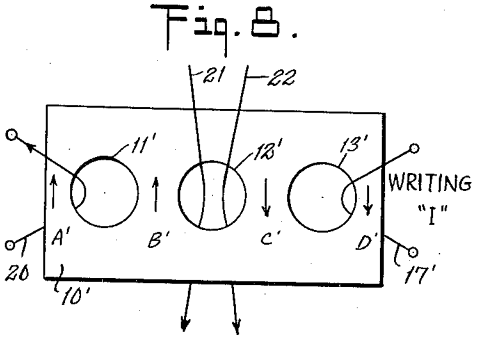
Figure 9:
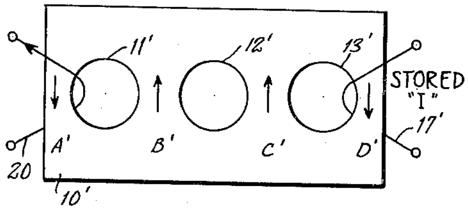

FIG. 8 of the drawings illustrates the flux pattern in the core device when the core is fully selected for a writing operation and a binary "1" is to be written into the core. To accomplish the writing operation, both drive windings 21 and 22 are simultaneously pulsed in the polarity illustrated, so that a clockwise flux pattern is established around aperture 12′ in the main flux path of the core. Since leg B′ is already saturated in the upward direction, leg A′ is switched, so that the flux in leg A′ is now in the upward direction. Therefore, the effect of bias winding 20 is overcome by the simultaneous application of two drive pulses in the write polarity to drive windings 21 and 22. Due to the fact that leg C′ is already saturated in the downward direction, leg D′ switches to establish a flux therein in the downward direction as seen in FIG. 8. This downward direction of flux in leg D′ indicates that a binary "1" is stored in the magnetic core. After the drive pulses applied to windings 21 and 22 are ended, the core returns to a quiescent state as shown in FIG. 9 of the drawings. Because the direction of the flux in leg A′ has been switched during the write operation, the bias winding 20 becomes effective upon the cessation of the drive pulses to switch the flux in leg A′ to its normal downward direction. Again, since the flux path through leg C′ is shorter than the path through leg D′, the flux in leg C′ switches to assume an upward direction. Therefore, the flux in leg D′ remains in the downward direction in the quiescent state of the core to indicate a stored binary "1."

Figure 10:
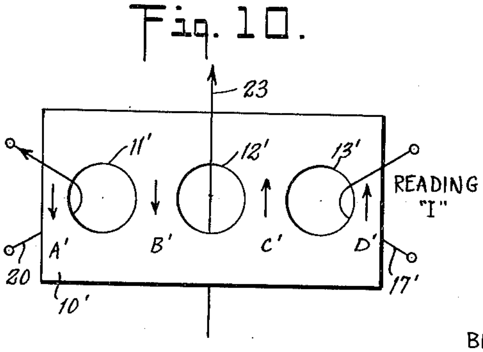
Figure 11:
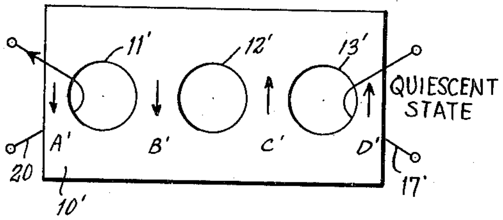

In order to read out the stored binary "1," the read winding 23, is pulsed as shown in FIG. 10 of the drawings to establish a flux pattern in the counterclockwise direction. Since leg A′ is already saturated in the downward direction by bias winding 20, leg B′ switches to also establish a flux in the downward direction. The flux in leg D′ then switches to an upward direction since leg C′ is already saturated in that direction. By virtue of the fact that the direction of flux in leg D′ has been reversed, an output pulse is produced in sense winding 17′ to indicate that a stored binary "1" is being read out. Upon the cessation of the read pulse applied to winding 23, the core assumes the quiescent state illustrated in FIG. 11 of the drawings. Again, it may be noted that the flux pattern does not change, since the flux in biased leg A′ was not reversed during the read operation. In the quiescent state following a read operation the flux in leg D′ is always in the upward direction indicating a stored binary "0."

As described above, the magnetic core device of the invention permits the storage of a binary "1" by the simultaneous energization of drive windings 21 and 22. When a binary "0" is to be written into the core, the drive windings 21 and 22 are not energized, so that the core remains in a quiescent state with a stored binary "0" therein. It may be noted that reading out of the core is accomplished by the energization of only a single read winding 23, since in order to establish a flux pattern in the required counterclockwise direction, it is not necessary to overcome the effect of bias winding 20. Furthermore, energization of either drive winding 21 or 22 alone does not switch the flux in leg D′ of the core, since it is ineffective to overcome the bias provided by winding 20 in leg A′. Accordingly, the magnetic core device described is capable of two-dimensional writing and single-dimensional reading.

While directions of flux and polarities of bias and drive currents in the above description and drawings have been chosen to produce a particular operating pattern, it will be understood that different directions of flux and polarities of current could be utilized depending upon the operational logic of the system in which the magnetic core device is to be used. For example, single-dimensional writing and two-dimensional reading could be accomplished by energizing drive winding 23 with the write pulse and drive windings 21 and 22 with read pulses. Similarly, it is not necessary that three separate drive windings be employed for the reading and writing operations. One of the write windings 21 and 22 could serve a dual function and be utilized as the read winding as well. This could be done merely by applying the read pulse to the selected write winding in the proper polarity to cause counterclockwise switching of the core. It will also be understood that by suitably increasing the bias and by employing an additional write drive winding, three-dimensional core selection may be obtained. This, of course, could be readily extended to "N" dimensions if desired. Furthermore, as explained in the aforementioned Raker application, anti-coincident three-dimensional writing could be accomplished by utilizing an inhibit or "Z" winding in aperture 11′. The Z winding would be driven in the same direction as the bias winding, so that writing would be prevented even though the X and Y write windings were to be energized. As explained in the aforementioned Raker application, the core 10′ may assume other shapes than that illustrated herein. For example, the core may be a toroidal core and may even have slots or square or elliptical apertures rather than circular apertures. Additionally, while single turns are shown for the windings, it will be understood that plural turns could be employed with equal effectiveness.

Figure 12:
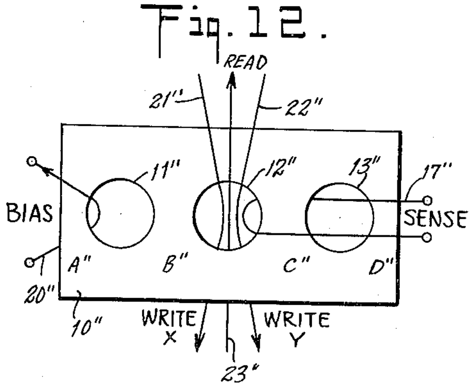
FIG. 12 is a schematic diagram of the magnetic core device of the invention having a modified sense winding arrangement.

FIG. 12 of the drawings shows the magnetic core device of the invention with a modified sense winding arrangement. As seen therein, the sense winding 17″ is arranged to link leg C″ of the core rather than leg D″, so that the output from the core is responsive to the flux changes in leg C″. By virtue of this arrangement, an output pulse is produced in sense winding 17″ when a stored "0" is read out of the core and no output pulse is produced when a stored "1" is read out. This may be readily seen by an inspection of FIGS. 3 and 4 of the drawings which illustrate the flux conditions in leg C″ during the reading out of a stored "0" and by an inspection of FIGS. 9 and 10 which illustrate the flux conditions in leg C″ during the reading out of a stored "1." Although this arrangement of the sense winding permits faster switching than that obtained with the winding placed on leg D″, due to a shorter flux path, the winding complexity is increased and there is some difficulty in cancelling noise produced by half-select switching in leg C″.

Figure 13:
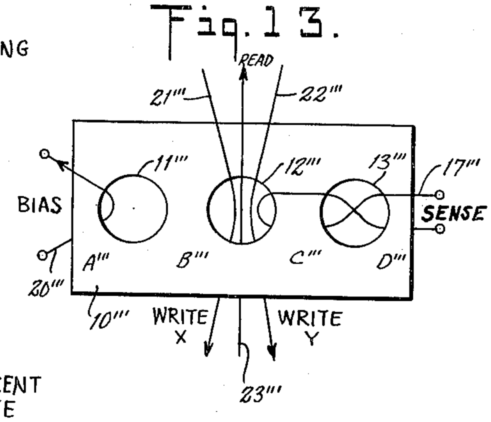
FIG. 13 is a schematic diagram of the magnetic core device of the invention with another modified sense winding arrangement.

FIG. 13 of the drawings shows the magnetic core device of the invention with still another sence winding arrangement. In this arrangement, the sense winding 17‴ possesses a "figure 8" configuration and links both legs C‴ and D‴ of the core, so that the output of the core is responsive to the flux changes in both legs C‴ and D‴. This provides a bipolar output with an output pulse of one polarity indicating the reading out of a stored "0" and an output pulse of the opposite polarity indicating the reading out of a stored "1." For example, with the polarities of bias and drive currents assumed to be as illustrated in FIG. 13, a positive-going output pulse would be produced in the sense winding during the reading out of a stored "1" and a negative-going pulse produced during the reading out of a stored "0." While the sense winding arrangement of FIG. 13 is very advantageous for sensing reasons, it does increase the winding complexity of the core device and usually requires a differential sense amplifier.

Figure 14:
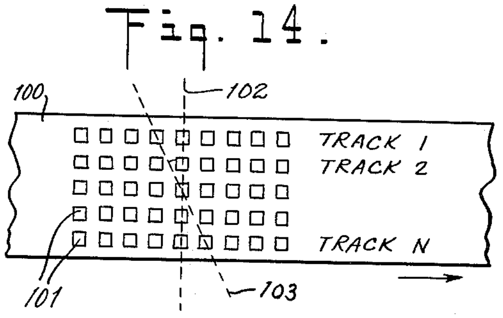
FIG. 14 is a schematic diagram of a portion of a magnetic tape having bits of binary information stored thereon.

Although the disclosed magnetic core device of the invention could be employed in many known magnetic storage or memory systems, it is especially valuable for use in buffering type applications, such as tape skew converter systems, for example, because of its ability to operate with two-dimensional writing and single-dimensional reading. FIG. 14 of the drawings illustrates a portion of a magnetic tape 100 having a plurality of binary bits 101 of information stored thereon. The stored bits are arranged in a plurality of tracks and a sensing head (not shown) is provided to sense the binary bits which form a "word" or "character" of information. The bits forming each word are arranged so as to be located along a line perpendicular to the direction of travel of the tape. Therefore, in FIG. 14, the bits of one particular word are located along dotted line 102, so that the first bit is located in track 1, the second bit in track 2, and the Nth bit in track N. As the tape moves, the bits forming each word are sensed by the sensing head and fed to a computer which then processes the stored information. Unfortunately, the tape and the sensing head may become skewed with respect to each other, so that the sensing head senses bits along a dotted line 103, for example. When this occurs, spurious information is fed into the computer because at a given instant, the bits of more than one word are being sensed by the sensing head.

In order to avoid this condition various tape "de-skewing" schemes have been proposed. One such scheme provides a system which operates to store the bits sensed by the sensing head in a storage matrix until all the bits of a particular word are stored. When the last bit of a word is stored, the bits comprising the entire word are simultaneously gated to the computer, so that the computer receives only the bits corresponding to a particular word. Although the tape de-skewing forms no part of the present invention, it will be described schematically with reference to FIG. 15 of the drawings to illustrate how the magnetic core device of the invention may be used in such a system.

Figure 15:
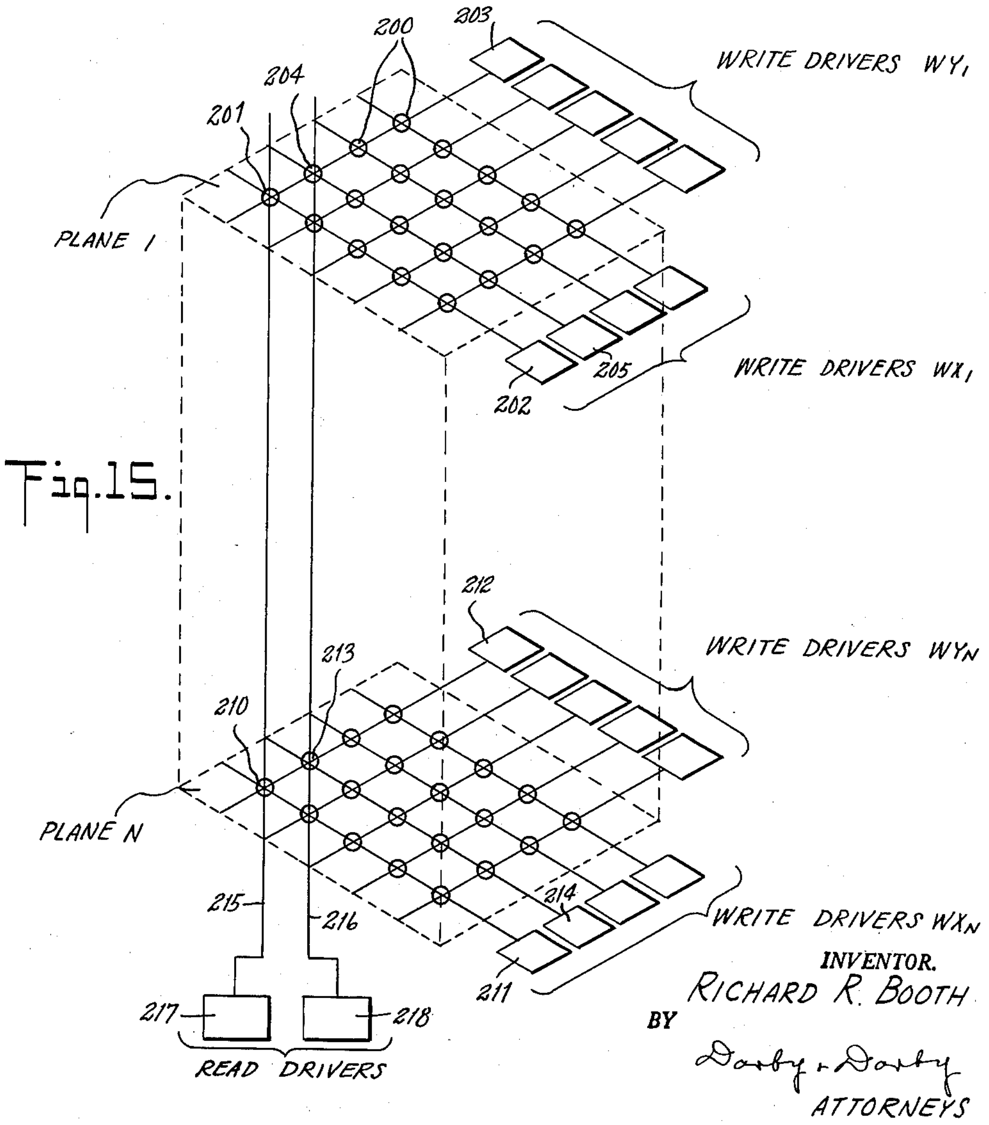
FIG. 15 is a schematic diagram of a tape skew converter system employing the magnetic core device of the invention.

As seen in FIG. 15, each track of the tape 100 has a plane of cores associated therewith. For example, plane 1 would be associated with track 1, plane 2 would be associated with track 2, and so on. Therefore, if there are N tracks on the tape, there would be N planes of cores in the de-skewing system. Each plane of cores is arranged with the cores forming a storage matrix in a known manner. In plane 1, for example, there is shown 20 cores 200 which may be the magnetic core devices of the invention. The cores are arranged in rows and columns, with each row and column having a particular write driver associated therewith. The write drivers for the rows are designated as $WX_1$ while the write drivers for the columns are designated $WY_1$. By simultaneously energizing a pair of write drivers, it is possible to select a particular core in the plane for the writing operation. For example, core 201 may be selected by the simultaneous energization of write driver 202 and write driver 203. Similarly core 204 may be selected for a writing operation by the simultaneous energization of drivers 203 and 205. For simplicity of illustration, the bias windings and the sense windings of the cores 200 are not shown. The bias windings of each of the cores 200 in plane 1 may be connected in series to a common source of bias supply, while the sense windings may be serially connected to the input of a computer or other data processing device. A complete wiring diagram of a storage matrix connected in this manner may be found in the aforementioned Raker patent application. The remaining N planes corresponding to the N tracks of the tape 100 are constructed in the same manner as plane 1, so that each plane has its own sets of write drivers for the X direction and the Y direction. Therefore, in plane N, for example, a core 210 may be selected for the writing operation by the simultaneous energization of write drivers 211 and 212. Similarly, core 213 may be selected for writing by the simultaneous energization of write drivers 212 and 214.

In operation, each core of each plane is arranged to store one bit of a different word. For example, core 201 would store the first bit of a word appearing in track 1, while core 210 would store the Nth bit of the same word appearing in track N of the tape. Accordingly, if a word were composed of 28 bits, for example, there would be 28 planes of cores and 28 cores would be selected to have the bits of the word written into them. The cores corresponding to the bits of each word are "stacked" vertically, so that a single read wire may be utilized to simultaneously read out each of the cores containing the bits of that word. Therefore, a read wire 215 is arranged to link cores 201 and 210, while a read wire 216 is arranged to link 204 and 213. The read wires 215 and 216 are driven by their respective read drivers 217 and 218. Although not illustrated, it will be understood that each "stack" of cores in FIG. 15 has its own read driver associated therewith. By virtue of this arrangement, it is possible to simultaneously read out a given vertical stack of cores corresponding to a particular stored word. As the tape 100 passes the sensing head, the first bit of a particular word is stored in a core of plane 1, the second bit of that word is stored in a core of plane 2 and the Nth bit of that word is stored in a core in plane N. When all the bits of the word have been stored, the appropriate read driver for that vertical stack of cores is energized to simultaneously gate the bits of information stored in the cores to the computer or other device. Since the bits corresponding to a particular word are not gated to the computer until all the bits of the word have been stored, it is immaterial whether the sensing head and tape are skewed with respect to each other. For example, core 201 is energizing by write drivers 202 and 203 as the first bit of a particular word appearing in track 1 passes under the sensing head. The second bit of the same word is stored in plane 2 by the simultaneous energization of the appropriate write drivers for plane 2 and the Nth bit of the same word is stored in core 210 by the simultaneous energization of write drivers 211 and 212. When the Nth bit has been stored in core 210, the read driver 217 is energized to read all of the cores linked by winding 215 so that a complete word is gated to the computer. Since the stack of cores linked by read winding 216 may be selected for writing independently of the stack of cores linked by read winding 215, it may be utilized to store the bits of the next succeeding word sensed by the sensing head, even though the storage of the first word is not yet completed. Therefore, since it is not essential that the bits corresponding to a particular word appear under the sensing head at the same time, the effect of tape skew is eliminated.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic core device comprising means defining a magnetic circuit having at least a pair of input flux paths, an output flux path and a main flux path coupling said input flux paths to said output flux path, means for magnetically biasing one of said input paths to saturation in a first direction, means for selectively driving the other of said input flux paths to saturation in said first direction to thereby establish a flux pattern in said main flux path in said first direction and for driving both of said input flux paths to saturation in a second direction to thereby establish a flux pattern in the main flux path in said second direction; and means for detecting a change in the flux pattern in said output flux path.

2. A magnetic core device comprising means defining a magnetic circuit having first and second pairs of flux paths and a main flux path coupling said pairs of flux paths together; means for magnetically biasing one path of said first pair of flux paths to saturation in a first direction; means for selectively driving the other path of said first pair of flux paths to saturation in said first direction to thereby establish a flux pattern in said main flux path in said first direction and for driving both paths of said first pair of flux paths to saturation in a second direction to thereby establish a flux pattern in the main flux path in said second direction, and means coupled to at least one path of said second pair of flux paths for detecting a change in the flux pattern therein.

3. A magnetic core device comprising means defining a magnetic circuit having first and second pairs of parallel-connected flux paths and a main flux path connecting said pairs of flux paths together; means coupled to one path of said first pair of flux paths for magnetically biasing said one path to saturation in a first direction, means coupled to said main flux path for selectively driving the other path of said first pair of flux paths to saturation in said first direction to thereby establish a flux pattern in said main flux path in said first direction and for driving both paths of said first pair of flux paths to saturation in a second direction to thereby establish a flux pattern in the main flux path in said second direction, and means coupled to at least one path of said second pair of flux paths for detecting a change in the flux pattern therein.

4. A magnetic core device comprising means defining a magnetic circuit having first and second pairs of parallel-connected flux paths and a main flux path serially connecting said pairs of flux paths together; means coupled to one path of said first pair of flux paths for magnetically biasing said one path to saturation in a first direction; first selectively operable drive means coupled to said main flux path for driving the other path of said first pair of flux paths to saturation in said first direction, whereby a flux pattern in said first direction is established in the main flux path; second selectively operable drive means coupled to said main flux path for driving both paths of said first pair of flux paths to saturation in a second direction, whereby a flux pattern in said second direction is established in the main flux path; and means coupled to at least one path of said second pair of flux paths for detecting a change in the flux pattern therein.

5. A magnetic core device as claimed in claim 4, wherein said second selectively operable drive means comprises a pair of selectively operable driving means, each driving means of said pair of driving means being independently operable to drive said other path of the first pair of flux paths to saturation in said second direction and being jointly operable with the other driving means of said pair of driving means to drive both paths of said first pair of flux paths to saturation in said second direction.

6. A magnetic core device comprising a core of magnetic material having first and second stable magnetic states and defining a closed magnetic circuit having first, second, third and fourth portions; bias winding means linking said first circuit portion for magnetically biasing said first portion to said first magnetic state; drive winding means linking said magnetic circuit for selectively driving said second circuit portion to said first magnetic state to thereby, with said bias winding means, drive said third and fourth circuit portions to said second magnetic state and for driving both said first and second circuit portions to said second magnetic state to thereby drive said third and fourth circuit portions to said first magnetic state; and output winding means linking at least one of said third and fourth circuit portions for sensing a change in the magnetic state thereof.

7. A magnetic core device comprising a core of magnetic material having first and second stable magnetic states and defining a closed magnetic circuit having parallel-connected first and second portions and parallel-connected third and fourth portions; bias winding means linking said first circuit portion for magnetically biasing said first portion to said first magnetic state; first selectively operable drive winding means linking said magnetic circuit for driving said second circuit portion to said first magnetic state to thereby, with said bias winding means, drive said third and fourth circuit portions to said second magnetic state; second selectively operable drive winding means linking said magnetic circuit for driving both said first and second circuit portions to said second magnetic state to thereby drive said third and fourth circuit portions to said first magnetic state; and output winding means linking at least one of said third and fourth circuit portions for sensing a change in the magnetic state thereof.

8. A magnetic core device comprising a core of magnetic material having first and second stable magnetic states and defining a closed magnetic circuit having parallel-connected first and second portions and parallel-connected third and fourth portions; bias winding means linking said first circuit portion for magnetically biasing said first portion to said first magnetic state; first selectively operable drive winding means linking said magnetic circuit for driving said second circuit portion to said first magnetic state to thereby, with said bias winding means, drive said third and fourth circuit portions to said second magnetic state; second and third selectively operable drive winding means linking said magnetic circuit, each of said second and third drive winding means being independently operable to drive said second circuit portion to said second magnetic state, said second and third drive winding means being jointly operable to drive both said first and second circuit portions to said second magnetic state, to thereby drive said third and fourth circuit portions to said first magnetic state; and output winding means linking at least one of said third and fourth circuit portions for sensing a change in the magnetic state thereof.

9. A magnetic memory device comprising a multi-legged core of magnetic material having first and second stable magnetic states, said core defining a closed magnetic circuit and having first, second and third apertures respectively defining first, second, third and fourth legs, said second and third legs respectively magnetically shunting said first and fourth legs; bias winding means intersecting said first aperture and linking said first leg for magnetically biasing said first leg to said first magnetic state; drive winding means intersecting said second aperture and linking said magnetic circuit for selectively driving said second leg to said first magnetic state to thereby, with said bias winding means, drive said third and fourth legs to said second magnetic state and for driving both said first and second legs to said second magnetic state to thereby drive said third and fourth legs to said first magnetic state; and output winding means intersecting at least said third aperture and linking at least one of said third and fourth legs for sensing a change in the magnetic state thereof.

10. A magnetic memory device comprising a multi-legged core of magnetic material having first and second stable magnetic states, said core defining a closed magnetic circuit and having first, second and third apertures respectively defining first, second, third and fourth legs, said second and third legs respectively magnetically shunting said first and fourth legs; bias winding means intersecting said first aperture and linking said first leg for magnetically biasing said first leg to said first magnetic state; first selectively operable drive winding means intersecting said second aperture and linking said magnetic circuit for driving said second leg to said first magnetic state, to thereby, with said bias winding means, drive said third and fourth legs to said second magnetic state and establish a flux pattern in said magnetic circuit in a clockwise or counterclockwise direction; second selectively operable drive winding means intersecting said second aperture and linking said magnetic circuit for driving both said first and second legs to said second magnetic state, to thereby drive said third and fourth legs to said first magnetic state and establish a flux pattern in said magnetic circuit in the opposite direction; and output winding means intersecting at least said third aperture and linking at least one of said third and fourth legs for sensing a change in the magnetic state thereof.

11. A magnetic memory device comprising a multi-legged core of magnetic material having first and second stable magnetic states, said core defining a closed magnetic circuit and having first, second and third apertures respectively defining first, second, third and fourth legs, said second and third legs respectively magnetically shunting said first and fourth legs; bias winding means intersecting said first aperture and linking said first leg for magnetically biasing said first leg to said first magnetic state; first selectively operable drive winding means intersecting said second aperture and linking said magnetic circuit for driving said second leg to said first magnetic state, to thereby, with said bias winding means, drive said third and fourth legs to said second magnetic state and establish a flux pattern in said magnetic circuit in a clockwise or counterclockwise direction; second and third selectively operable drive winding means intersecting said second aperture and linking said magnetic circuit, each of said second and third drive winding means being independently operable to drive said second leg to said second magnetic state and said third leg to said first magnetic state, said second and third drive winding means being jointly operable to drive both said first and second legs to said second magnetic state, to thereby drive said third and fourth legs to said first magnetic state and establish a flux pattern in said magnetic circuit in the opposite direction; and output winding means intersecting at least said third aperture and linking at least one of said third and fourth legs for sensing a change in the magnetic state thereof.

12. A magnetic memory device as claimed in claim 11, wherein said output winding means intersects said third aperture and links said fourth leg.

13. A magnetic memory device as claimed in claim 11, wherein said output winding means intersects said second and third apertures and links said third leg.

14. A magnetic memory device as claimed in claim 11, wherein said output winding means intersects said second and third apertures and links said third and fourth legs.

References Cited in the file of this patent

UNITED STATES PATENTS 2,926,342 Rogers ------------------ Feb. 23, 1960